United States Patent
Colgan et al.

(10) Patent No.: US 6,752,539 B2
(45) Date of Patent: Jun. 22, 2004

(54) APPARATUS AND SYSTEM FOR PROVIDING OPTICAL BUS INTERPROCESSOR INTERCONNECTION

(75) Inventors: Evan G. Colgan, Chestnut Ridge, NY (US); Daniel J. Stigliani, Jr., Hopewell Junction, NY (US)

(73) Assignee: International Buisness Machines Corporation, Armonk, NY (US)

( * ) Notice: Subject to any disclaimer, the term of this patent is extended or adjusted under 35 U.S.C. 154(b) by 173 days.

(21) Appl. No.: 10/185,304

(22) Filed: Jun. 28, 2002

(65) Prior Publication Data

US 2004/0001676 A1 Jan. 1, 2004

(51) Int. Cl.[7] .............................................. G02B 6/36
(52) U.S. Cl. ........................ 385/92; 385/4; 385/30; 385/90
(58) Field of Search ................... 385/2–4, 30, 88–94; 257/715, 778

(56) References Cited

U.S. PATENT DOCUMENTS

| | | | |
|---|---|---|---|
| 3,777,154 A | 12/1973 | Lindsey | 250/227 |
| 4,695,120 A | 9/1987 | Holder | 350/96.11 |
| 5,009,476 A | 4/1991 | Reid et al. | 350/96.11 |
| 5,159,700 A | 10/1992 | Reid et al. | 385/14 |
| 5,241,614 A | 8/1993 | Ecker et al. | 385/94 |
| 5,638,469 A | 6/1997 | Feldman et al. | 385/14 |
| 5,761,350 A | 6/1998 | Koh | 385/14 |
| 5,818,984 A | 10/1998 | Ahmad et al. | 385/14 |
| 6,243,509 B1 | 6/2001 | Chen | 385/14 |
| 6,272,271 B1 | 8/2001 | Wojnarowski et al. | 385/52 |
| 6,459,160 B1 * | 10/2002 | Goldmann et al. | 257/778 |
| 6,525,420 B2 * | 2/2003 | Zuo et al. | 257/715 |

FOREIGN PATENT DOCUMENTS

EP     0 446 410 A2      9/1991

OTHER PUBLICATIONS

IBM Technical Disclosure Bulletin, vol. 22, No. 8B, Jan. 1980, "Module–To–Module Communication Via Fiber–Optic Piping"; Authors: L. Balliet, V.S. Moore, C.N.. Romero, R. A. Wantshouse and T.J. Wylie; pp. 3519–3520.
IBM Technical Disclosure Bulletin, vol. 32, No. 3A, Aug. 1989, "Optical Wiring Using Holographic Beam Deflection"; pp. 98–103.
IBM Technical Disclosure Bulletin, vol. 28, No. 1, Jun. 1985, "Module Interconnection By Optical Fibers"; pp. 237–238.

* cited by examiner

*Primary Examiner*—Phan T. H. Palmer
(74) *Attorney, Agent, or Firm*—Floyd A. Gonzalez; Cantor Colburn LLP

(57) ABSTRACT

An exemplary embodiment of the present invention is an apparatus for providing optical interprocessor communication. The apparatus comprises a multichip module and an optical module. The multichip module includes a substrate, an integrated circuit electrically connected to the substrate and a hermetically sealed cover. The hermetically sealed cover encloses a sealed portion of the substrate and the integrated circuit is inside of the sealed cover. The optical module includes an optical transceiver located on the substrate outside of the sealed portion and the optical transceiver is electrically connected to the integrated circuit through the substrate.

23 Claims, 3 Drawing Sheets

APPARATUS AND SYSTEM FOR PROVIDING OPTICAL BUS INTERPROCESSOR INTERCONNECTION

FIELD OF THE INVENTION

This invention relates to fiber optic technology. More specifically, the invention relates to an apparatus for providing optical interprocessor communication.

BACKGROUND OF THE INVENTION

A multichip module (MCM) is an electronic package structure consisting of two or more "bare" or unpackaged integrated circuits (ICs) interconnected on a common substrate (e.g., a ceramic substrate). The interconnects are usually multiple layers, separated by insulating material, and interconnected by conductive vias. MCMs are known to provide significant performance enhancements over single chip packaging approaches. Advantages of MCMs include a significant reduction in the overall size and weight of the package, which directly translates into reduced system size. Thus, first level advantages include: higher silicon packaging density, short chip-to-chip interconnections and low dielectric constant materials. These advantages lead to the following secondary benefits: increased system speed, increased reliability, reduced weight and volume, reduce power consumption and reduced heat dissipated for the same level of performance.

The ICs can be attached to the common substrate using a flip chip attachment method in which all the input/output (I/O) bumps on an IC are first terminated with a solder material such as a lead/tin high melting temperature alloy. The IC is then flipped over and the solder bumps are aligned and reflowed in a reflow furnace to effect all the I/O connections with the bonding pads on the substrates. A related interconnect technology is C4 (controlled collapse chip connection) which is a method of using a lead-rich lead/tin alloy to mount chips directly to high temperature ceramic substrates. C4 flip chip structures can be built directly over exposed aluminum vias located at the top surface of a wafer.

Computer systems built with multiple MCMs or multiple nodes require the ability for MCMs within the computer system to communicate back and forth. One way to provide high-speed communication of MCM to MCM data is to send the signals electronically. However, the electronic approach can suffer from a lack of scalability in speed due to losses and signal distortion within the printed circuit board that the MCM is attached to, due to electrical connectors, and due to backplane boards that may connect multiple boards containing MCMs. The electrical signal distortion is particularly acute when the boards containing MCMs are on different backplanes. Optical fiber technology has been used as an I/O data interface between computer systems. As processor speeds and densities increase, electrical signaling may not scale with the processor speeds and optical technologies may be required to play a role in: board-to-board (inter-frame) interconnection, card-to-card (intra-frame) communication, module-to-module interconnection, and any combination of these.

One approach to providing high speed optical communication between components (e.g., MCMs) within a computer is to place an optical transceiver on the support printed circuit (PC) board that mounts either single chip modules or a MCM. This approach may not provide speed and scalability because the electrical signal still needs to exit the MCM through the PC card which can limit the speed due to factors such as pin inductance, signal loss in the card, and distortion. It can also consume more power because of the required module drivers and will take up extra space on the PC board.

Another approach to providing high speed optical communication between MCMs is to place the optical transceivers on the MCM within the hermetic seal portion of the MCM. The hermetic seal design should be sufficient to protect the ICs and assist in ensuring chip reliability. The seal typically includes a metal or ceramic casing or cover which encapsulates and seals the MCM to protect against both stray electrical fields and to protect against environmental factors such as water vapor and gases. Placing the optical transceivers on the MCM within the hermetic seal solves the electrical problems associated with the first approach, but requires the development of a new method of exiting fiber optics through the seal or including an optical connector within the seal. This could present a difficult technical and manufacturing problem and may compromise the integrity of the seal.

SUMMARY OF THE INVENTION

An exemplary embodiment of the present invention is an apparatus for providing optical interprocessor communication. The apparatus comprises a multichip module and an optical module. The multichip module includes a substrate, an integrated circuit electrically connected to the substrate and a hermetically sealed cover. The hermetically sealed cover encloses a sealed portion of the substrate and the integrated circuit is inside of the sealed cover. The optical module includes an optical transceiver located on the substrate outside of the sealed portion and the optical transceiver is electrically connected to the integrated circuit through the substrate. An additional embodiment includes a system for providing interprocessor communication.

DESCRIPTION OF THE DRAWINGS

Referring now to the figures wherein the like elements are numbered alike.

DETAILED DESCRIPTION OF THE INVENTION

Figure 1:
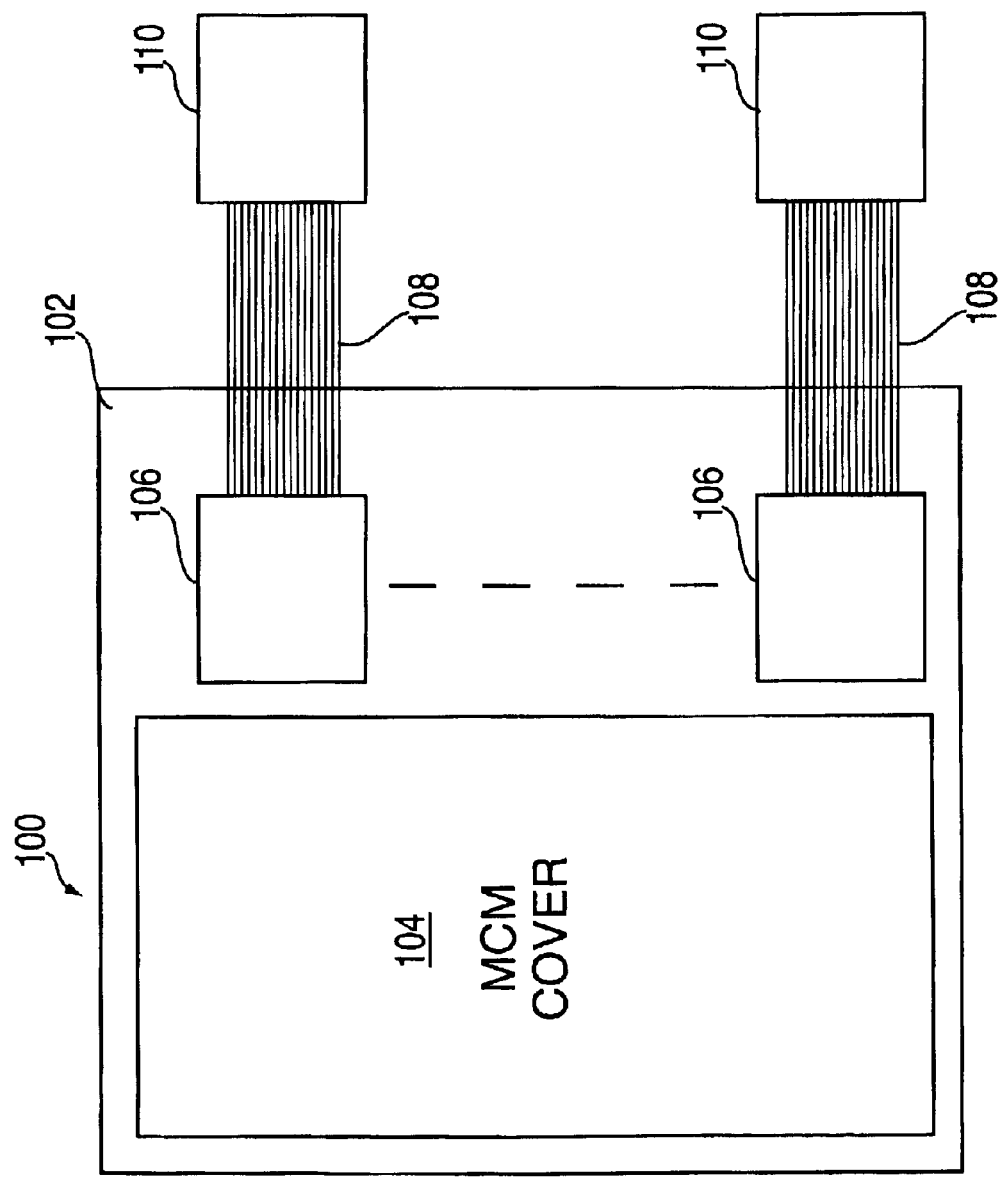
FIG. 1 illustrates an exemplary embodiment of the present invention.

An exemplary embodiment of the present invention utilizes fiber optic technology to enable high speed serial communication between MCMs within the same computer system or on different computer systems. FIG. 1 illustrates an exemplary embodiment of the present invention. As depicted in FIG. 1, a MCM 100 includes a MCM substrate 102 (e.g., a ceramic substrate, an organic material substrate or an Si_substrate) that extends beyond the hermetically sealed MCM cover 104. In an exemplary embodiment the substrate 102 extends half an inch beyond the MCM cover 104 but other lengths are possible depending on the amount of space required by the optical module. The exemplary optical modules shown in FIG. 1 include a transceiver 106, fiber 108 and a connector 110. The optical tranceiver 106 converts electrical signals from the MCM 100 into optical signals to be sent to the fiber 108 and it converts optical signals from the fiber 108 into electrical signals to be sent to the MCM 100. A plurality of optical transceivers 106 with pigtail fiber optic cables 108 are attached to the extended MCM substrate 102 outside of the MCM cover 104. Other optical embodiments can include an optical connector 110 integrated in the optical transceiver 106, separate transmitter and receiver modules, and a separate interface chip which may be within the seal area. The electrical signals can be brought out beyond the seal area via internal metal signal lines and surface on the top of the substrate 102 with high density electrical interconnections (e.g., C4 pads). Internal wires are added to the MCM 100 to allow the connection from a C4 on an optical transceiver 106 to ICs that are under the MCM cover 104. The wires extend from the C4 in the optical transceiver 106 IC to the other ICs on the substrate 102. This allows the optical transceiver 106 to be placed close to the appropriate driver chips (e.g., a few millimeters). An alternate embodiment includes a single optical transceiver 106 attached to the extended MCM substrate 102. In the exemplary embodiment depicted in FIG. 1, the optical transceivers 106 include a multiplicity of fibers (e.g., twenty four, 2×12) for a full duplex link. Some fibers contain outbound light (from lasers) and some fibers contain incoming light fibers (to photodiodes). As depicted in FIG. 1, the pigtail fiber optic cables 108 are terminated in industry standard optical connectors 110.

Any kind of fiber 108 and any kind of optical module known in the art (e.g., 50/125 micrometer multimode fiber, parallel optical module) may be utilized in an alternate embodiment of the present invention. In another alternate exemplary embodiment, the optical transceivers 106 include high density fiber optic connectors. The use of high density optical connectors enable more optical signals in the same space as a lower density connector (e.g., 6×12 vs. 2×12). In another alternate embodiment of the present invention, the optical transceiver 106 has been fabricated on a ceramic carrier, or similar material, in order to minimize the thermal expansion mismatch with the MCM 100 and therefore allowing for the use of fine pitch solder joins (e.g., C4). In another exemplary embodiment, the optical transceiver 106 module includes VCSELs (vertical cavity surface emitting laser), photodiodes, necessary support electronics for mux/demux, code/decode, and is optically interconnected using multimode or singlemode optical fiber. The integration of the functions into the optical module reduces cost and size. Also, the inclusion of code/decode and singlemode fiber enables the link to go longer distances. The embodiment depicted in FIG. 1 shows a 2D implementation, however an embodiment of the present invention could be used to support a 3D implementation.

Figure 2:
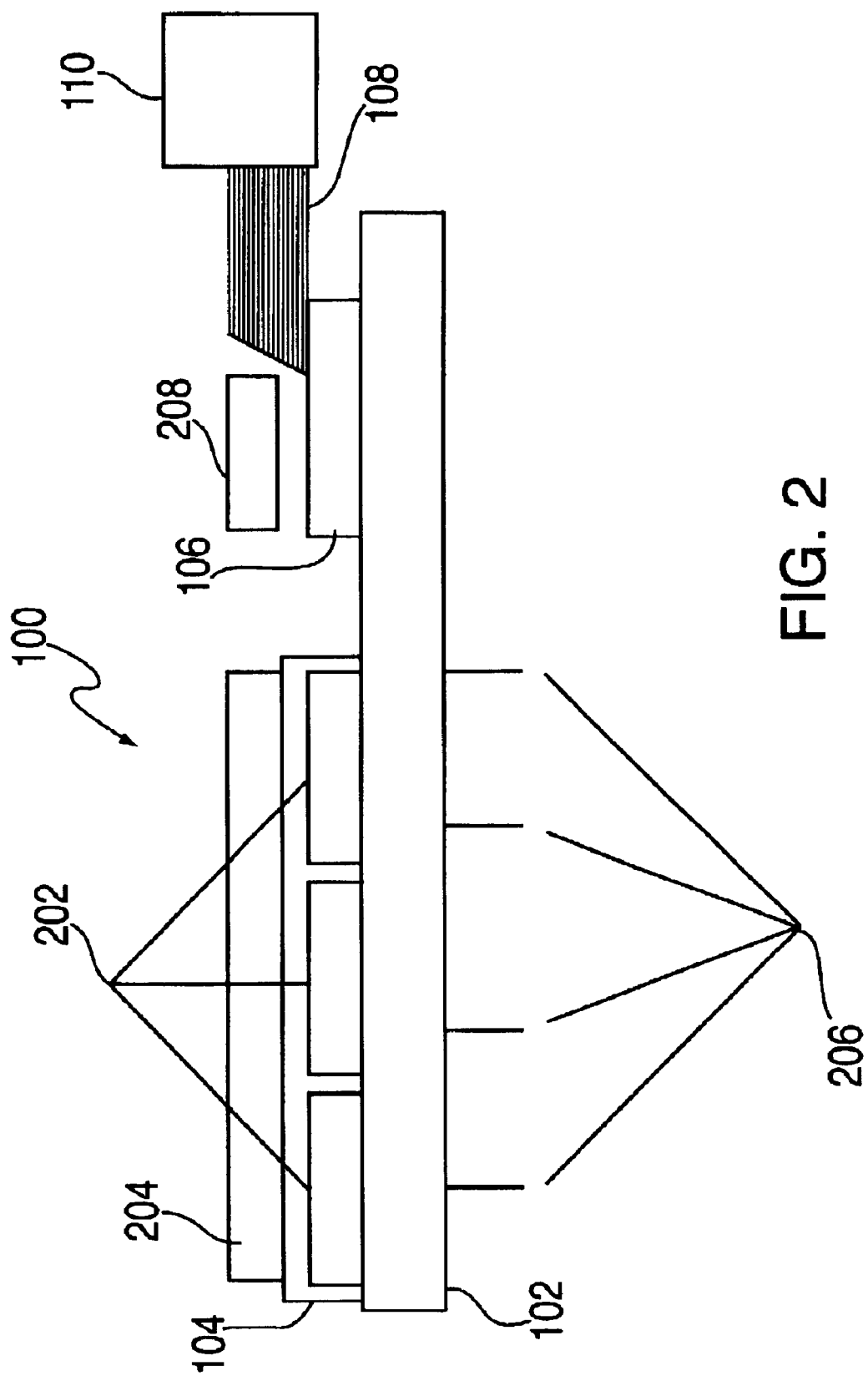
FIG. 2 illustrates a side view of the exemplary embodiment depicted in FIG. 1.

FIG. 2 illustrates a side view of the exemplary embodiment depicted in FIG. 1. The MCM 100 includes a substrate 102, MCM cover 104 and optical transceiver 106. The exemplary MCM 100 includes a heat sink 204 on the top of the MCM cover 104 to reduce the temperature of the MCM 100 and a plurality of pins 206 or other connecting means for power, signals and ground on the bottom of the substrate 102. Good thermal contact is made to the heat sink/cover combination by placing a thermal grease or other heat conveying means between the chips and the cover. In an exemplary embodiment, the apparatus is powered electrically. Under the MCM cover 104 are the silicon chips 202 or ICs 202. Similar to FIG. 1, the optical transceiver 106 is connected to fiber 108 which is connected to an optical connector 110, alternatively, the optical connector 110 could be integrated into the optical transceiver 106. The electronics or ICs 202 are placed the same way on the MCM 100 that they would have been placed in the absence of the optical transceiver 106. In addition, the heat sink 204 and pins 206 do not need to be reconfigured to allow for the optical transceiver 106. The exemplary embodiment depicted in FIG. 2 also contains a separate heat sink 208. Having an independent heat sink ensures that the heat generated by the chips under the MCM cover 104 does not directly heat the optical transducer (also referred to as the optical module). The heat sink and optical transducer may be combined into one unit. Alternately, the optical module heat sink 208 may be connected to and/or common with, heat sink 204.

Figure 3:
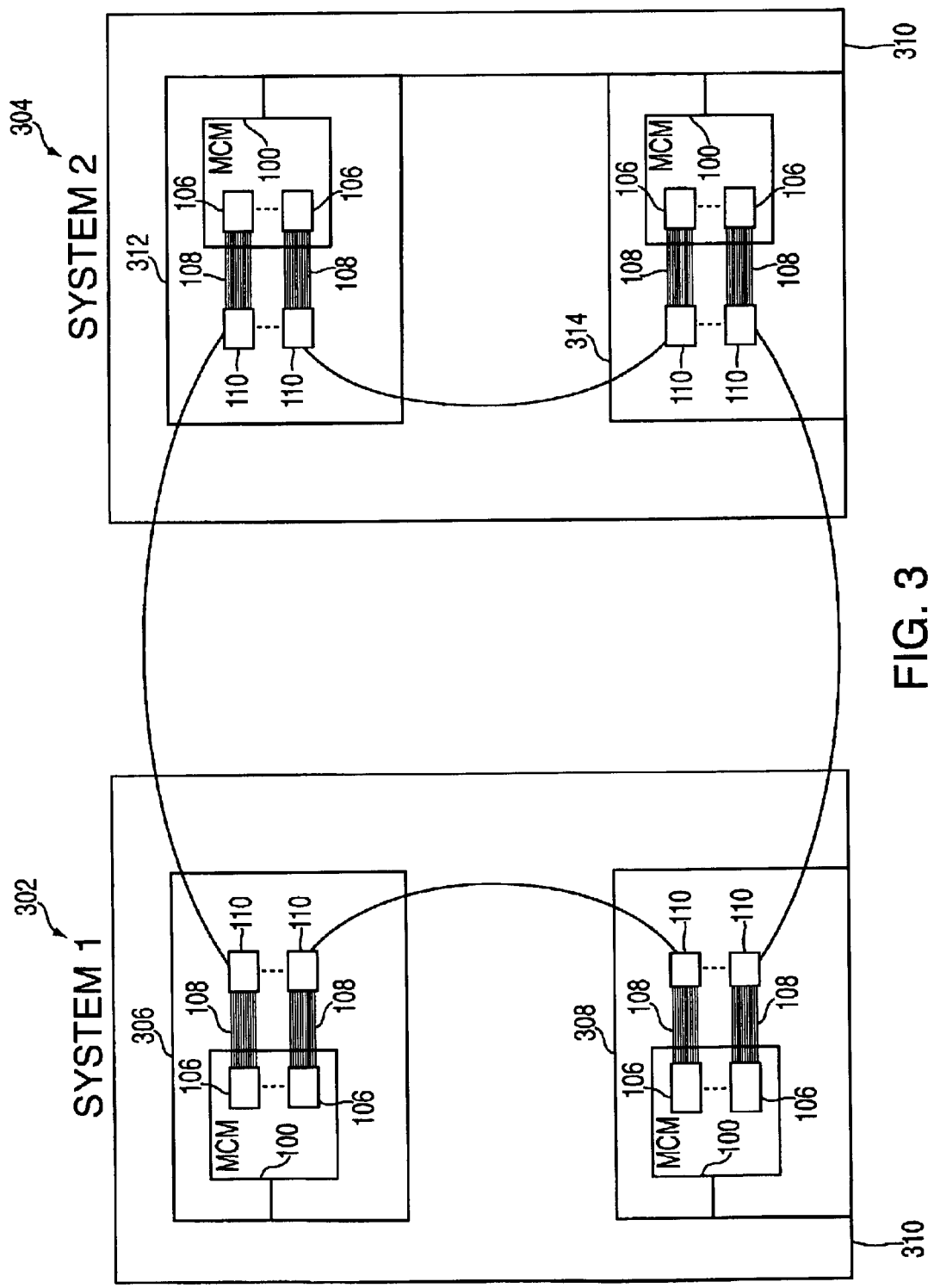
FIG. 3 shows an example of optical communication between multichip modules using an embodiment of the present invention.

FIG. 3 shows an example of optical communication between MCMs using an embodiment of the present invention. A computer system can include one or more nodes and each node can include one or more MCMs 100. Each node can function as a self-contained computer and includes elements to implement the MCM 100, memory, and I/O functions. Additional nodes are added as additional processing power is needed and the resulting nodes need a way to communicate back and forth. FIG. 3 depicts "system 1" 302 that includes several nodes 306 308. Each node 306 308 includes an MCM 100 with optical transceivers 106 as depicted in FIG. 1 along with the corresponding fiber 108 and optical connectors 110. In another exemplary embodiment, the optical connector may be integrated with the transceiver and an additional connector placed at the end of the node (e.g., tailstock). The nodes 306 308 are connected to each other in "system 1" 302 through an electrical backplane 310. In an exemplary embodiment of the present invention, the nodes 306 308 communicate internal data through optical connectors 110 as depicted in FIG. 3. In addition, FIG. 3 illustrates a second system "system 2" 304 that includes a plurality of nodes 312 314 similar to "system 1" 302. An MCM 100 in a node 306 in "system 1" 302 can communicate to an MCM 100 in a node 312 in "system 2" 304 through corresponding optical connectors 110. The amount of distance allowed between "system 1" 302 and "system 2" 304 is dependent on the particular optical module hardware and fiber type being utilized. Though not shown in FIG. 3, an alternate embodiment of the present invention includes multiple MCMs 100 within the same node communicating data using an optical module. In general, all nodes must communicate with all other nodes in the total system (e.g., System 1 and System 2 in FIG. 3). This can be done via a direct connection, or point to point topology, from any node to all other nodes. An alternate exemplary embodiment is shown in FIG. 3 where node 306, node 308, node 312, and node 314 are connected in a ring topology. In addition, an exemplary embodiment may utilize a switched topology to interconnect all the nodes.

The present invention allows for the implementation of fiber technology to enable high speed (e.g., ten to over one-hundred gigabyte per second) serial communication between nodes. By placing the optic transceivers 106 directly on the MCM and outside of the hermetically sealed MCM cover 104, the speed of the fiber link becomes the limiting criteria. Keeping the lines short and using the MCM substrate 102 characteristics allows the highest possible electrical data rate to and from the optical transceivers 106. The speed of the fiber optics allows the multiplexing of several electrical signals onto one fiber. For example, a five byte wide electrical interface (running at two gigabytes per second) can be multiplexed into a single byte wide optical interface running at ten gigabytes per second. In addition, electrical interconnect at these speeds requires differential signaling (two wire per signal). The reduction of electrical wires as compared to fibers can be up to ten times (five for multiplexing, two for a single fiber as compared to a wire pair).

The present invention allows for using optics for data communication without making changes to the placement of the ICs, the heat sink, and the pins that are already on the MCM. In an exemplary embodiment of the present invention, both electrical and optical I/O signals may be utilized. An advantage of keeping the optic transceiver 106 outside of the hermetically sealed MCM cover 104 is that the expense of moving data optically into and out of the hermetic seal is avoided. In addition, if the optic module fails it can be pulled off and repaired or replaced without affecting the ICs under the MCM cover 104. The present invention can yield the high speed advantages described above without compromising the seal and can be easily implemented using existing MCMs.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiments for carrying out this invention, but that the invention will include all embodiments falling within the scope of the appended claims.

What is claimed is:

1. An apparatus for providing optical interprocessor communication, said apparatus comprising:
    a multichip module including:
        a substrate;
        an integrated circuit electrically connected to said substrate; and
        a hermetically sealed cover, wherein said hermetically sealed cover encloses a sealed portion of said substrate and wherein said integrated circuit is inside of said sealed cover; and
        an optical module, wherein said optical module includes an optical transceiver located on said substrate outside of said sealed portion and wherein said optical transceiver is electrically connected to said integrated circuit through said substrate.

2. The apparatus of claim 1 wherein said optical module further includes an optical fiber integrated into said optical transceiver.

3. The apparatus of claim 2 wherein said optical module further includes an optical connector attached to said optical fiber.

4. The apparatus of claim 3 wherein said optical connector is a remote connector.

5. The apparatus of claim 2 wherein said optical fiber is a pigtail fiber optics cable including a plurality of link fibers.

6. The apparatus of claim 2 wherein said optical fiber is located on said substrate outside of said sealed portion.

7. The apparatus of claim 1 wherein said optical transceiver is electrically connected to said integrated circuit through said substrate using a high density electrical interconnection.

8. The apparatus of claim 7 wherein said high density electrical interconnection is a C4 connection.

9. The apparatus of claim 1 wherein said optical transceiver includes a transmitter module and a receiver module.

10. The apparatus of claim 1 wherein said substrate is a ceramic substrate.

11. The apparatus of claim 1 wherein said substrate is an organic substrate.

12. The apparatus of claim 1 wherein said optical transceiver is fabricated on a ceramic carrier.

13. The apparatus of claim 1 wherein said optical transceiver is fabricated on an organic carrier.

14. The apparatus of claim 1 wherein said optical module further includes an optical connector integrated into said optical transceiver.

15. A system for providing optical interprocessor communication, said system comprising:
    a local multichip module including:
        a substrate;
        an integrated circuit electrically connected to said substrate; and
        a hermetically sealed cover, wherein said hermetically sealed cover encloses a sealed portion of said substrate and wherein said integrated circuit is inside of said sealed cover;
        an optical module, wherein said optical module includes an optical transceiver located on said substrate outside of said sealed portion and wherein said optical transceiver is electrically connected to said integrated circuit through said substrate; and
        a computer circuit including instructions to format and send data from said local multichip module to a remote multichip module.

16. The system of claim 15 wherein said remote multichip module and said local multichip module are located on the same node.

17. The system of claim 15 wherein said remote multichip module and said local multichip module are located on different nodes within the same system.

18. The system of claim 15 wherein said remote multichip module and said local multichip module are located on different systems.

19. The system of claim 15 wherein said computer circuit includes further instructions to receive data at said local multichip module from said remote multichip module.

20. The system of claim 15 wherein said local multichip module further includes said computer circuit.

21. The system of claim 15 wherein said optical module further includes said computer circuit.

22. The system of claim 15 wherein said optical transceiver includes a separate transceiver module and receiver module.

23. A system for providing optical interprocessor communication, said system comprising:
    a local multichip module including:
        a substrate;
        an integrated circuit electrically connected to said substrate; and
        a hermetically sealed cover, wherein said hermetically sealed cover encloses a sealed portion of said substrate and wherein said integrated circuit is inside of said sealed cover;
        an optical module, wherein said optical module includes an optical transceiver located on said substrate outside of said sealed portion and wherein said optical transceiver is electrically connected to said integrated circuit through said substrate; and
        a computer circuit including instructions to receive data at said local multichip module from a remote multichip module.

* * * * *